United States Patent
Ma et al.

(10) Patent No.: US 7,542,237 B2
(45) Date of Patent: Jun. 2, 2009

(54) APPARATUS AND METHOD FOR SLIDER INCLUDING SHAPE MEMORY ALLOY PADS IN A HARD DISK DRIVE

(75) Inventors: Xiaoquang Ma, Fremont, CA (US);
ChaoYuan Chen, San Jose, CA (US);
Sang Lee, Pleasanton, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 483 days.

(21) Appl. No.: 11/450,135

(22) Filed: Jun. 8, 2006
(Under 37 CFR 1.47)

(65) Prior Publication Data
US 2007/0285841 A1 Dec. 13, 2007

(51) Int. Cl.
*G11B 21/20* (2006.01)
(52) U.S. Cl. .................................. 360/235.1
(58) Field of Classification Search .............. None
See application file for complete search history.

(56) References Cited

U.S. PATENT DOCUMENTS

2007/0291419 A1* 12/2007 Lee et al. ............... 360/294.4
2007/0297080 A1* 12/2007 Lee ......................... 360/59
2008/0002305 A1* 1/2008 Kwon et al. ............ 360/294.4

* cited by examiner

*Primary Examiner*—Mark Blouin
(74) *Attorney, Agent, or Firm*—Earle Jennings; GSS Law Group (57) ABSTRACT

Slider including at least one pad including shape memory alloy layer with titanium oxide contact layer. When slider contacts disk surface, pad(s) undergoes solid-to-solid phase change from the first to second phase, absorbing energy and possibly deforming. When contact is removed, the pad recovers its shape as shape metal alloy undergoes a reverse solid-to-solid phase change. A shape memory alloy of elements refers to any molecular or crystalline combination which is a solid possessing the shape memory property of at least two solid phases in the operating and storage conditions of a hard disk drive. A head gimbal assembly including the slider, head stack assembly including at least one head gimbal assembly, and the hard disk drive including the head stack assembly. Manufacturing methods for the slider, the head gimbal assembly, the head stack assembly, and the hard disk drive, as well as the products of these manufacturing processes.

21 Claims, 8 Drawing Sheets

APPARATUS AND METHOD FOR SLIDER INCLUDING SHAPE MEMORY ALLOY PADS IN A HARD DISK DRIVE

TECHNICAL FIELD

This invention relates to hard disk drives, in particular, to apparatus and methods of contact between a slider and a disk surface in a crash start stop hard disk drive.

BACKGROUND OF THE INVENTION

Contemporary hard disk drives include an actuator assembly pivoting through an actuator pivot to position one or more read-write heads, embedded in sliders, each over a rotating disk surface. The data stored on the rotating disk surface is typically arranged in concentric tracks. To access the data of a track, a servo controller first positions the read-write head by electrically stimulating the voice coil motor, which couples through the voice coil and an actuator arm to move a head gimbal assembly in lateral positioning the slider close to the track. Once the read-write head is close to the track, the servo controller typically enters an operational mode known herein as track following. It is during track following mode that the read-write head is used to access data stored in the track. Micro-actuators provide a second actuation stage for lateral positioning the read-write head during track following mode. They often use an electrostatic effect and/or a piezoelectric effect to rapidly make fine position changes. They have doubled the bandwidth of servo controllers and are believed essential for high capacity hard disk drives from hereon.

A central feature of the hard disk drive industry is its quest for greater data storage density, leading to continued reduction in track width, and the size of the read head within the read-write head. As the read head shrinks, the read signal it can generate will grow weaker. While contemporary hard disk drives have a preamplifier located in the actuator assembly, this weak read signal must travel from the slider a path with significant resistance before it can be amplified. What is needed is a mechanism strengthening the read signal before it leaves the slider.

In recent years, the hard disk drive industry has primarily employed a method of parking the sliders when not in use known as the Contact Start Stop method. This method parks the sliders in contact with the disk surfaces, which are not rotating, or at least not rotating very much during this parking operation. In this process, there is contact sliding between the slider and the disk surface in the landing zone, and it is difficult to prevent wear on both the slider and the disk surface media.

In the prior art, Diamond Like Carbon (DLC) pads are used for the contact material in sliders. They extend the air bearing surface, and act to reduce stiction and take-off velocity due to reduced contact between the pads and the disk surface. The DLC pads are made of a hard material known as DLC films, and while in general they provide extended wear resistance, they have a problem. The severe contact between the slider and the disk surface may degrade the normal performance of the hard disk drive, especially as the flying height becomes smaller and smaller when the read-write head of a slider accesses the data on the disk surface.

Additionally, the DLC pads are made of a carbon based thin film, as is the disk surface. The carbon-carbon contact causes tribological problems such as slider/disk wear and scratches on the disk surface, resulting in more performance problems. What is needed are slider pads which address at least one, and preferably all of these problems.

SUMMARY OF THE INVENTION

A shape memory alloy as used herein is a solid material having at least two solid phases, so that when the material is subjected to changes in temperature or pressure, it tends to go from the first phase to the second or from the second phase to the first.

The invention's slider mechanism includes at least one pad including a shape memory alloy with a contact layer of titanium oxide. The slider operates as follows: when the slider and disk surface are in contact, the pad or pads undergo a solid-to-solid phase change from the first phase to the second phase, absorbing a large amount of energy and possibly deforming from the contact. When contact is removed between the slider and disk surface, the pad recovers its shape as the shape metal alloy undergoes a reverse solid-to-solid phase change, from the second phase to the first phase. Titanium oxide is very dense and provides excellent corrosion resistance for the pad. Using at least one shape metal alloy for the pads of the slider minimizes contact induced damage and improves the reliability of the hard disk drive including these sliders.

The slider may preferably include more than one pad including the shape metal alloy. As used herein, the pads of a slider make contact with a disk surface included in the hard disk drive parks the sliders. The pads contact the disk surface, which is accessed by the slider for data when rotated.

As used herein a shape memory alloy of two or more elements will refer to any molecular or crystalline combination of those elements which is a solid possessing the shape memory property of at least two solid phases in the operating and storage conditions of a hard disk drive.

The shape memory alloy may include at least one member of the titanium nickel shape memory alloy group consisting of: a Titanium Nickel (TiNi) alloy, a Titanium Nickel Iron (Ti—Ni—Fe) alloy, a Titanium Nickel Copper (Ti—Ni—Cu) alloy, a Titanium Nickel Lead (Ti—Ni—Pb) alloy, and a Titanium Nickel Hafnium (Ti—Ni—Hf) alloy.

The invention includes a method of manufacturing the slider, by forming the pads, which includes forming the layer of the shape metal alloy coupling to the slider substrate and forming the layer of titanium oxide on the layer of the shape metal alloy.

The pads are preferably formed by forming a layer of Diamond Like Carbon (DLC) on the slider substrate, followed by a layer of the shape metal alloy, preferably titanium nickel (TiNi), on the layer of DLC, and forming a layer of titanium oxide (TiO) on the shape memory alloy through oxidation.

The invention's head gimbal assembly includes the slider. The invention's head stack assembly includes at least one of the head gimbal assembly coupled to an actuator arm of a head block. The invention's hard disk drive includes the head stack coupling through an actuator pivot to a voice coil for use in the voice coil motor of the hard disk drive.

The invention includes the manufacturing methods for the slider, the head gimbal assembly, the head stack assembly, and the hard disk drive, as well as the products of these manufacturing processes.

DETAILED DESCRIPTION

Figure 3A:
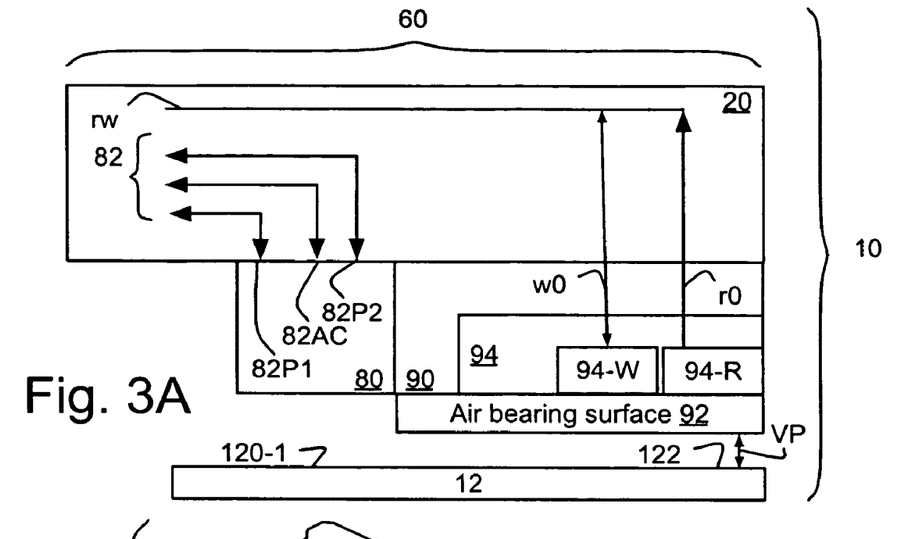
FIGS. 3A, 3B and 4B show several views of a head gimbal assembly in accord with the invention.
Figure 4A:
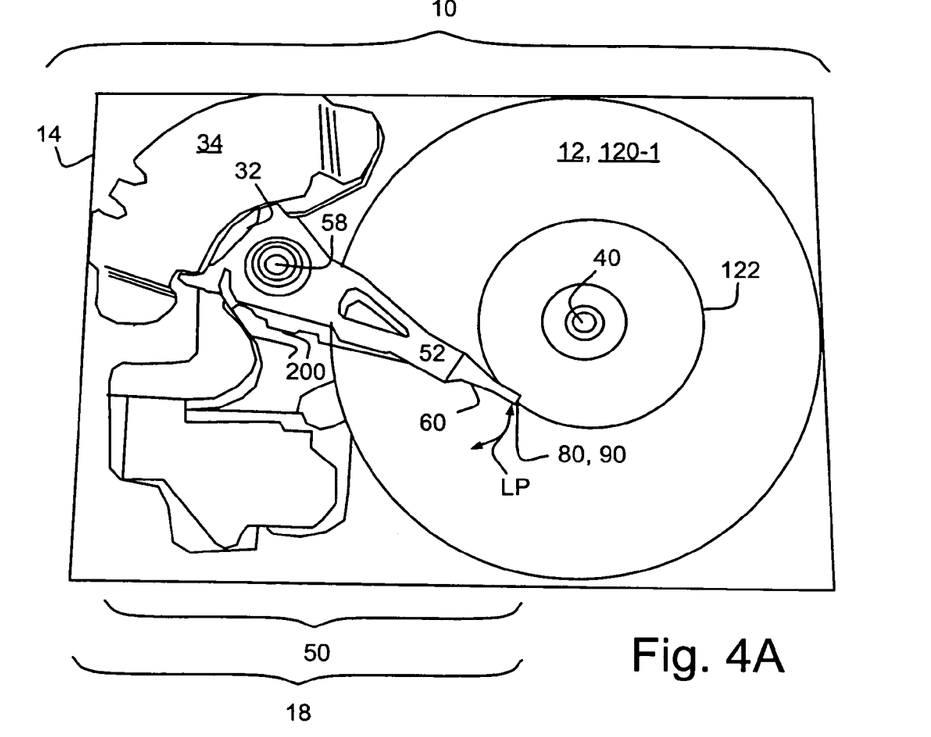
FIGS. 4A and 5 show various aspects of the hard disk drive in accord with the invention.
Figure 5:
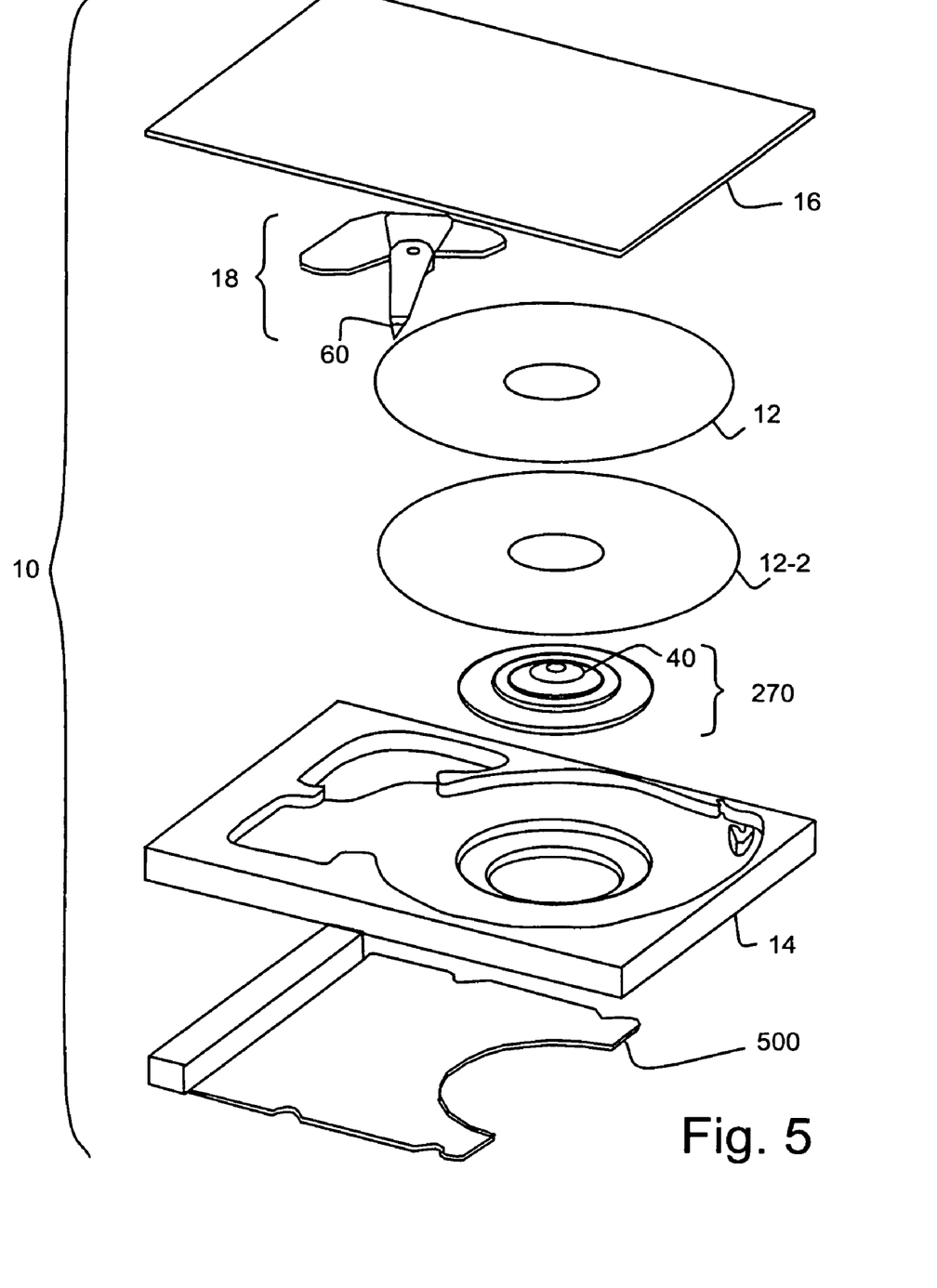

This invention relates to hard disk drives, in particular, to apparatus and methods of contact between a slider 90 and a disk surface 120-1 in a crash start stop hard disk drive 10 as shown in FIGS. 3A, 4A and 5. A shape memory alloy as used herein is a solid material having at least two solid phases, so that when the material is subjected to changes in temperature or pressure, it tends to go from the first phase to the second or from the second phase to the first.

Figure 1A:
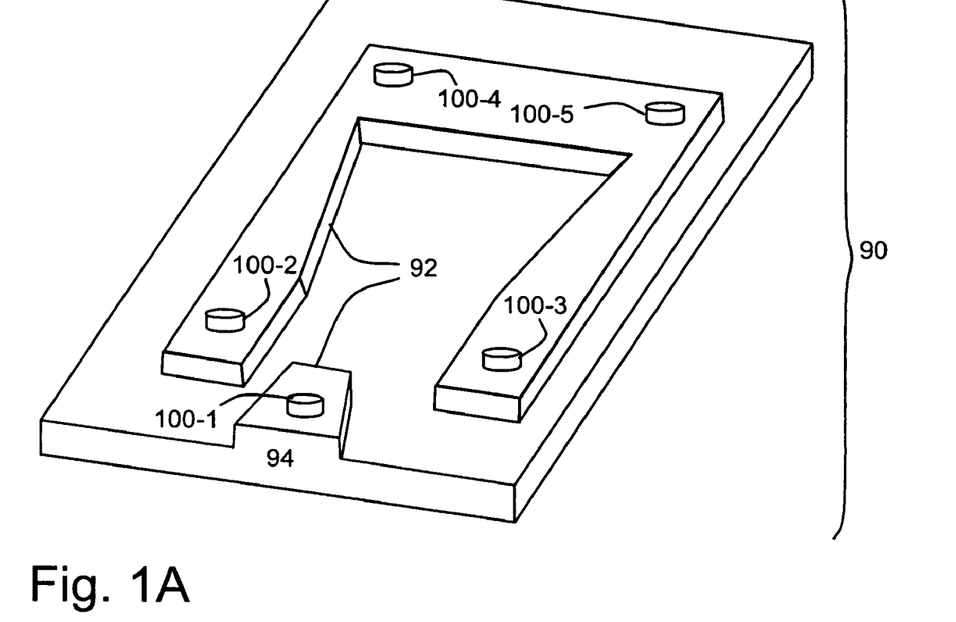
FIGS. 1A and 1B show two views of a slider in accord with the invention.
Figure 1B:
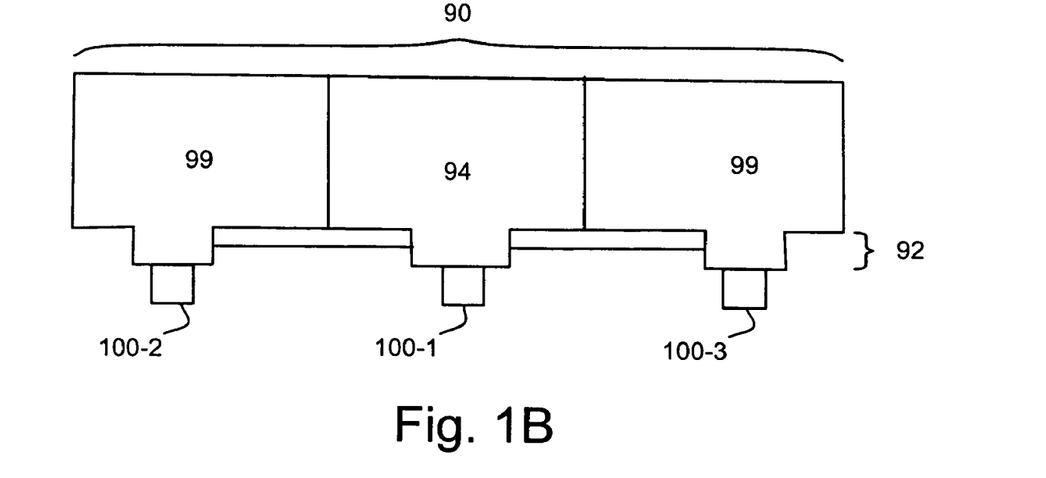
Figure 2A:
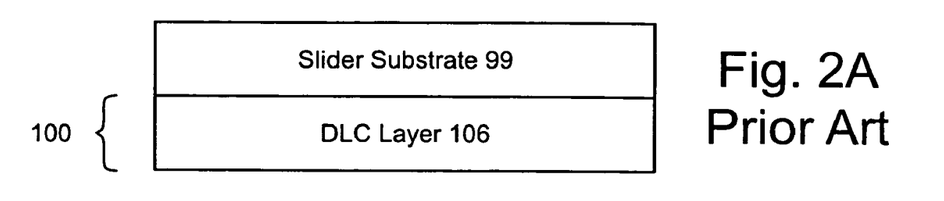
FIG. 2A shows a pad of the prior art.
Figure 2B:
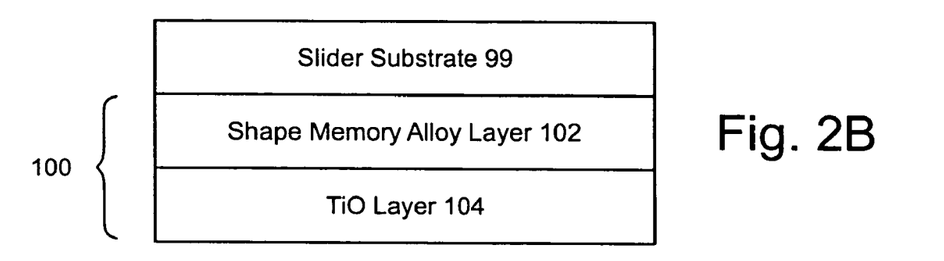
FIGS. 2B to 2D show various examples of the layers of a pad in accord with the invention.
Figure 2C:
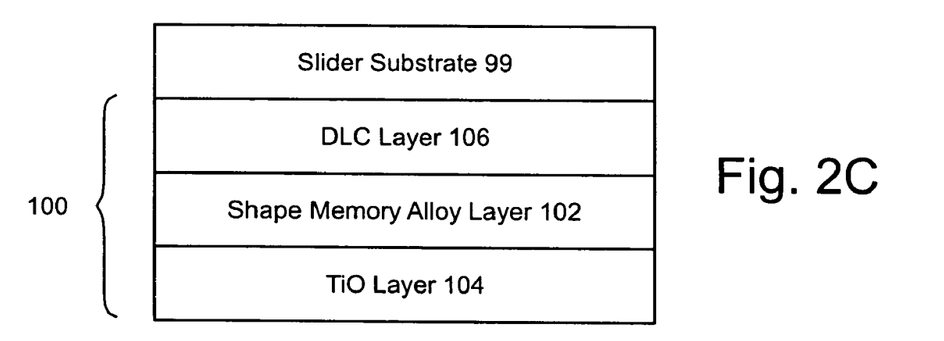
Figure 2D:
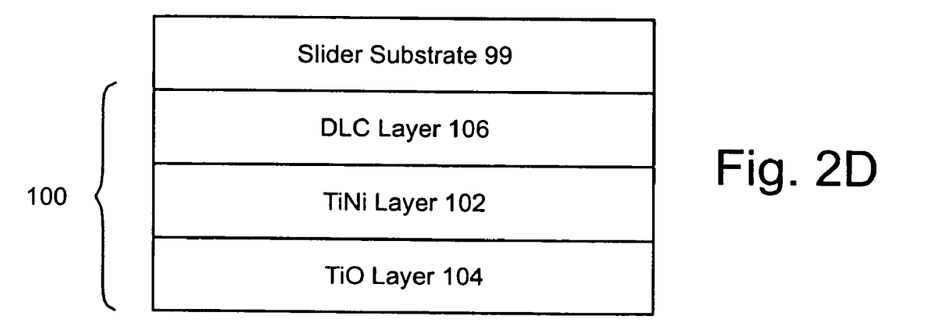

The invention's slider 90 includes at least one pad 100 as shown in FIGS. 1A and 1B. The pad 100 including a shape memory alloy layer 102 with a contact layer of titanium oxide 104 as shown in FIGS. 2B to 2D. The slider operates as follows: when the slider and disk surface 120-1 of FIG. 3A are in contact, the pad or pads undergo a solid-to-solid phase change from the first phase to the second phase, absorbing a large amount of energy and possibly deforming from the contact. When contact is removed between the slider and disk surface, the pad recovers its shape as the shape metal alloy undergoes a reverse solid-to-solid phase change, from the second phase to the first phase. Titanium oxide is very dense and provides excellent corrosion resistance for the pad. Using at least one shape metal alloy for the pads of the slider minimizes contact induced damage and improves the reliability of the hard disk drive including these sliders.

The slider 90 may preferably include more than one pad 100 including the shape metal alloy. As used herein, the pads of a slider make contact with a disk surface 120-1 when the hard disk drive 10 parks the sliders. The pads contact the disk surface, which is accessed by the slider for data when rotated. In further detail, FIGS. 1A and 1B show the slider including a first pad 100-1, a second pad 100-2, a third pad 100-3, a fourth pad 100-4, and a fifth pad 100-5, any and preferably, all these pads include a shape memory alloy layer 102 coated by the contact layer of Titanium oxide 104, as shown in FIGS. 2B to 2D.

As used herein a shape memory alloy of two or more elements will refer to any molecular or crystalline combination of those elements which is a solid possessing the shape memory property of at least two solid phases in the operating and storage conditions of the hard disk drive 10.

The shape memory alloy used in the layer of shape memory alloy 102 may include at least one member of the titanium nickel shape memory alloy group consisting of: a Titanium Nickel (TiNi) alloy, a Titanium Nickel Iron (Ti—Ni—Fe) alloy, a Titanium Nickel Copper (Ti—Ni—Cu) alloy, a Titanium Nickel Lead (Ti—Ni—Pb) alloy, and a Titanium Nickel Hafnium (Ti—Ni—Hf) alloy.

The invention includes a method of manufacturing the slider 90, by forming at least one of the pad 100, which includes forming the layer of the shape metal alloy 102 coupling to the slider substrate 99 and forming the contact layer of titanium oxide 104 on the layer of the shape metal alloy, as shown in FIG. 2B.

The pad 100 may further be formed by forming a layer of Diamond Like Carbon 106 (DLC) on the slider substrate 99, followed by a layer of shape metal alloy 102, as shown in FIG. 2C.

The pad 100 may further be formed by forming the contact layer of titanium oxide 104 (TiO) on the layer of shape memory alloy 102 through oxidation to coat the layer of the shape memory alloy.

The pad 100 may further preferably be formed with the layer of shape memory alloy 102 including Titanium Nickel (TiNi), as shown in FIG. 2D.

Figure 8A:
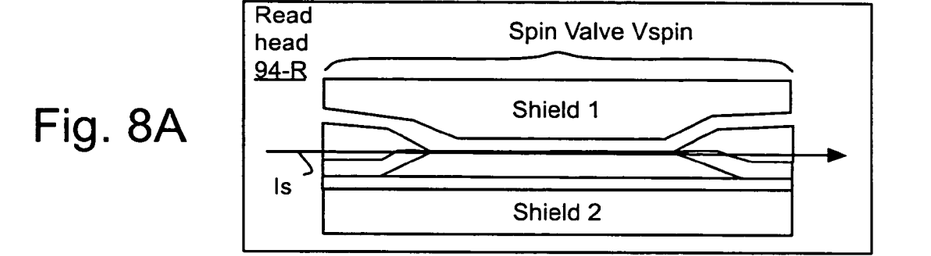
FIGS. 8A and 8C show various aspects of the invention's slider including a spin valve in the read head.

The slider 90 includes a read head 94-R and a write head 94-W, which are often collectively referred to as a read-write head 94. The read head may includes a spin valve Vspin, as shown FIG. 8A. Spin valves have been in use the since the mid 1990's. A spin valve typically employs a magneto-resistive effect to generate a sense current Is, which is parallel the shields Shield1 and Shield2. The overall cross section of such a slider is shown in FIG. 8C, where the read head is essentially perpendicular to the air bearing surface 92, due to the sensing current flowing between the shields.

Figure 8B:
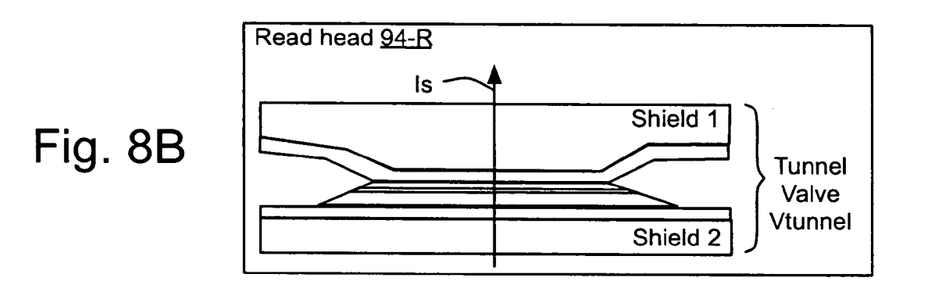
FIGS. 8B and 8D show various aspects of the invention's slider including a tunnel valve in the read head.
Figure 8C:
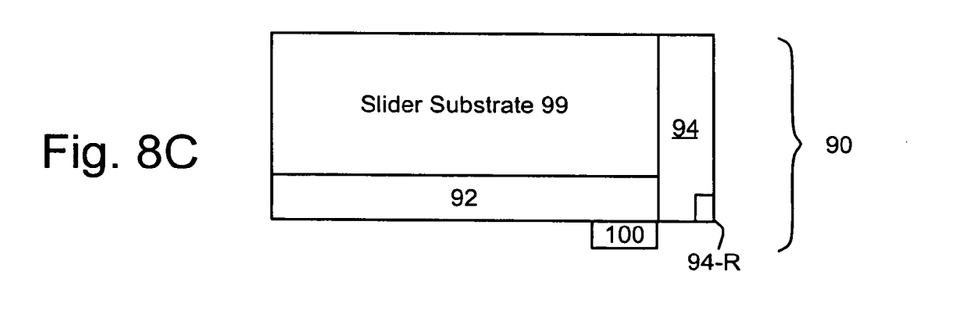
Figure 8D:
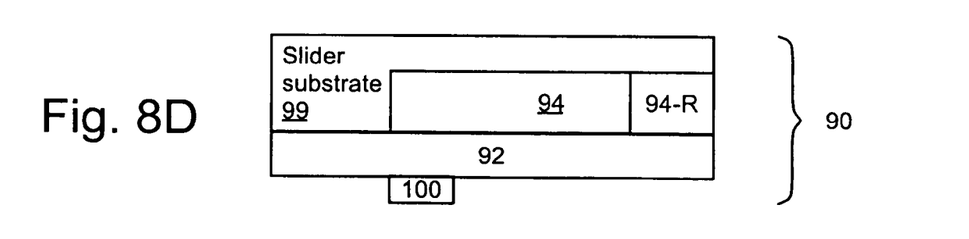

Alternatively, the slider 90 may include a read head 94-R including a tunnel valve Vtunnel, as shown in FIG. 8B. A tunnel valve typically uses a tunneling effect to generate a sense current Is, which is perpendicular the shields Shield1 and Shield2. The overall cross section of such a slider is shown in FIG. 8D, where the read head 94-R is essentially parallel the air bearing surface.

The bit polarization of the track 122 is different for a read head 94-R using a spin valve than for the read head using the tunnel valve. The spin-valve related polarization is in the plane of the disk surface. Tunnel valve related polarization is perpendicular to the plane of the disk surface. This difference in bit polarization lead to the announcement of a large increase in data density, a jump of almost two hundred percent in the spring of 2005.

Figure 3B:
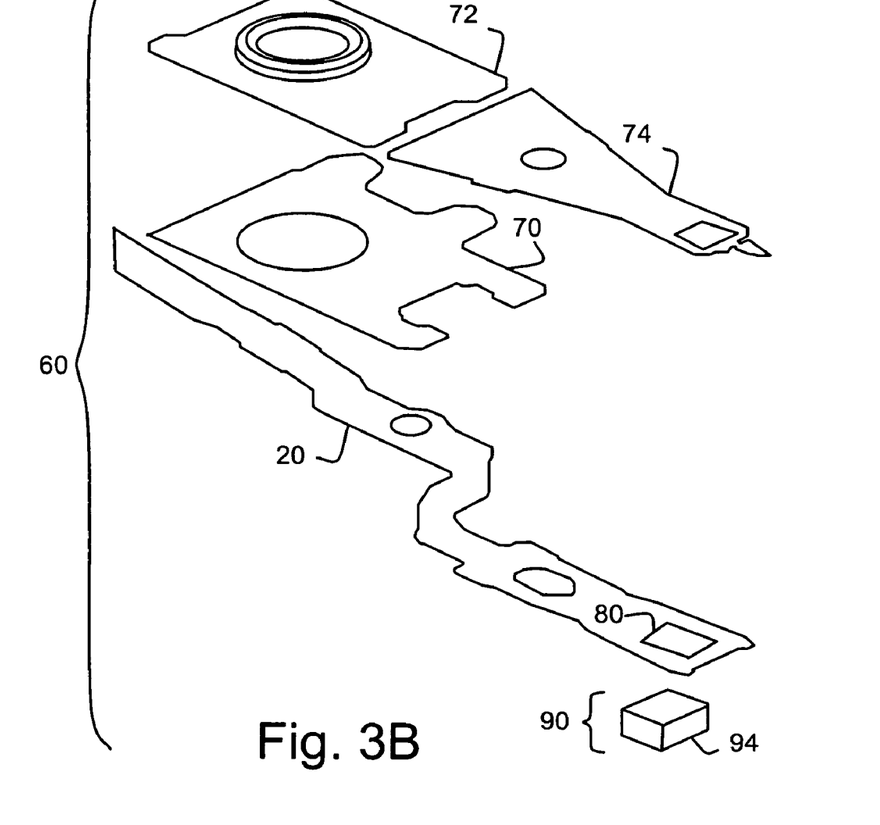
Figure 4B:
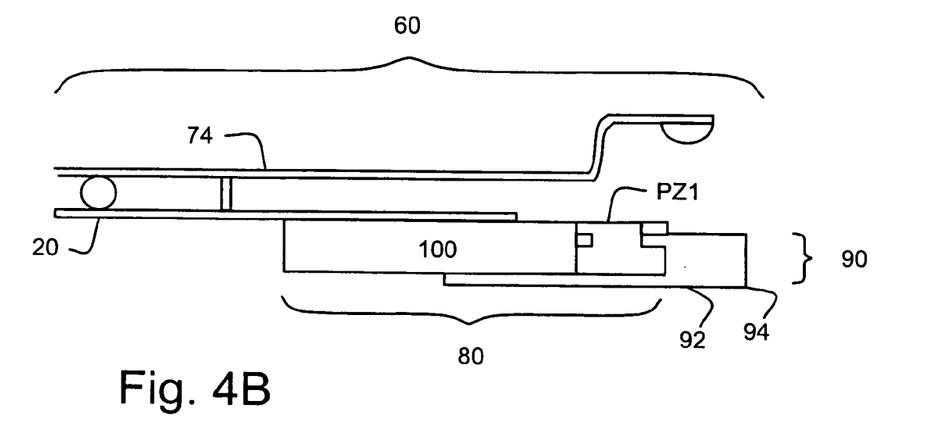

The invention's head gimbal assembly 60 includes the slider 90, as shown in FIGS. 3A, 3B and 4B. The head gimbal assembly preferably includes the flexure finger 20 coupled with the slider. The head gimbal assembly operates as follows when read accessing the data 122, preferably organized as the track 122, on the rotating disk surface 120-1. The slider reports a read signal as the result of the read access. The flexure finger provides the read trace path for the read signal. The read signal is often preferred to be a differential signal pair.

The head gimbal assembly 60 may further include a micro-actuator assembly 80 mechanically coupling to the slider 90 to aid in positioning the slider to access the data 122 on the rotating disk surface 120-1. The micro-actuator assembly may further include a first micro-actuator power terminal 82P1 and a second micro-actuator power terminal 82P2, as well as an Alternating Current (AC) power terminal 82AC, which may collectively comprise the lateral position signal 82. Operating the head gimbal assembly may further preferably include operating the micro-actuator assembly to aid in positioning the slider to read access the data on the rotating disk surface.

In further detail, the flexure finger 20 may be coupled to the load beam 74 as shown in FIG. 4B. The head gimbal assembly 60 preferably includes a base plate 72 coupled through a hinge 70 to a load beam 74. Often the flexure finger 20 is coupled to the load beam and the micro-actuator assembly 80 and slider 90 are coupled through the flexure finger to the head gimbal assembly.

Figure 6A:
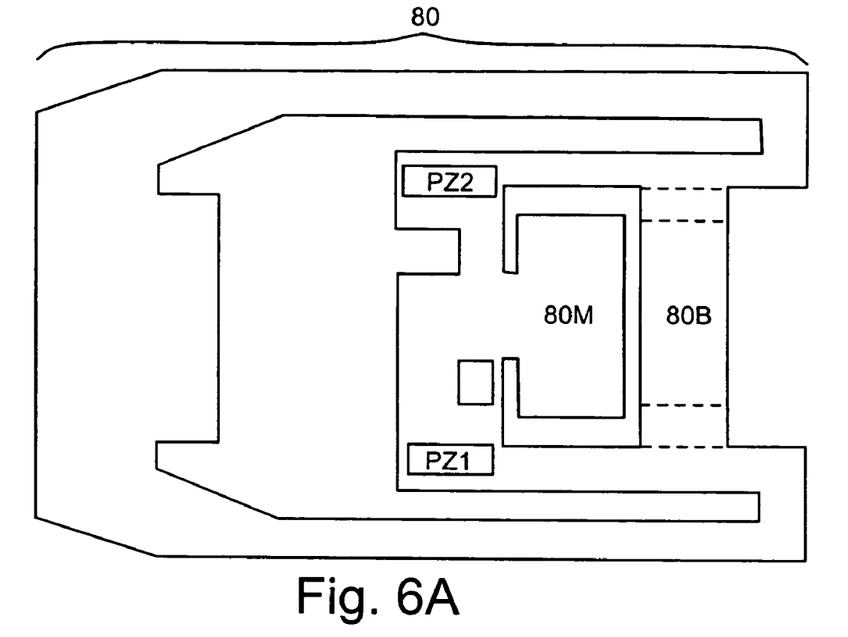
FIGS. 6A and 6B show various aspects of the head gimbal assembly including a micro-actuator employing a piezoelectric effect to aid in positioning the slider of the invention.
Figure 6B:
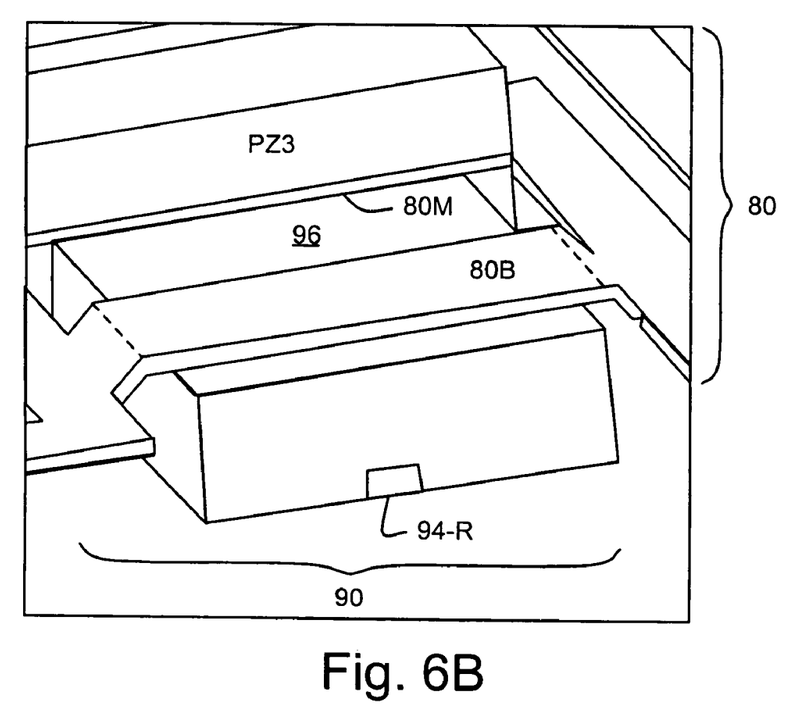

Examples of micro-actuator assemblies employing the piezoelectric effect are shown in FIGS. 4B, 6A and 6B. FIG. 4B shows a side view of a head gimbal assembly with a micro-actuator assembly 80 including at least one piezoelectric element PZ1 for aiding in laterally positioning LP of the slider 90. In certain embodiments, the micro-actuator assembly may consist of one piezoelectric element. FIG. 6A shows a micro-actuator assembly including the first piezoelectric element and a second piezoelectric element PZ2, which may preferably both aid in laterally positioning the slider. FIG. 6B shows a front perspective view of the micro-actuator assembly coupled with the slider with a third piezoelectric element PZ3 to aid in the vertically positioning the slider to the rotating disk surface 120-1.

Figure 7A:
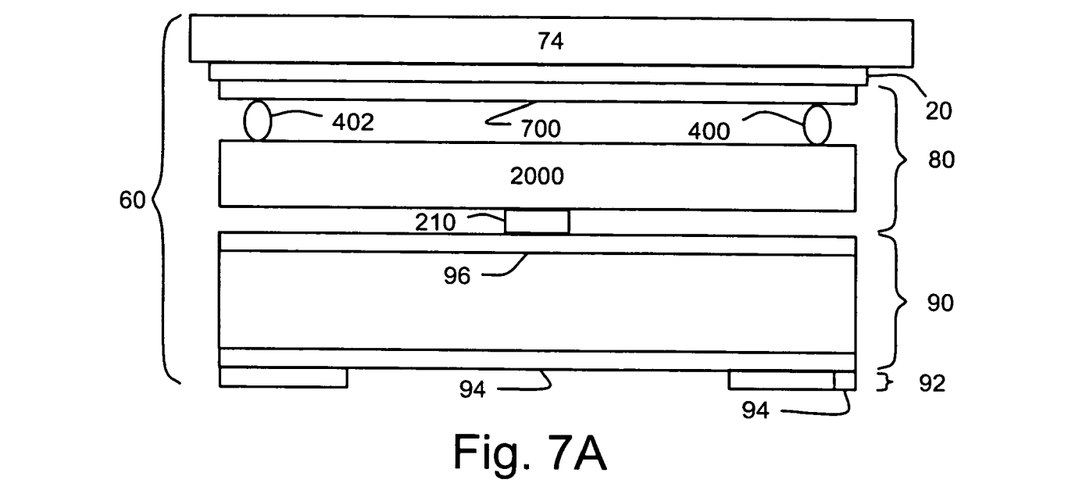
FIGS. 7A and 7B show various aspects of the head gimbal assembly including a micro-actuator employing an electrostatic effect to aid in positioning the slider of the invention.
Figure 7B:
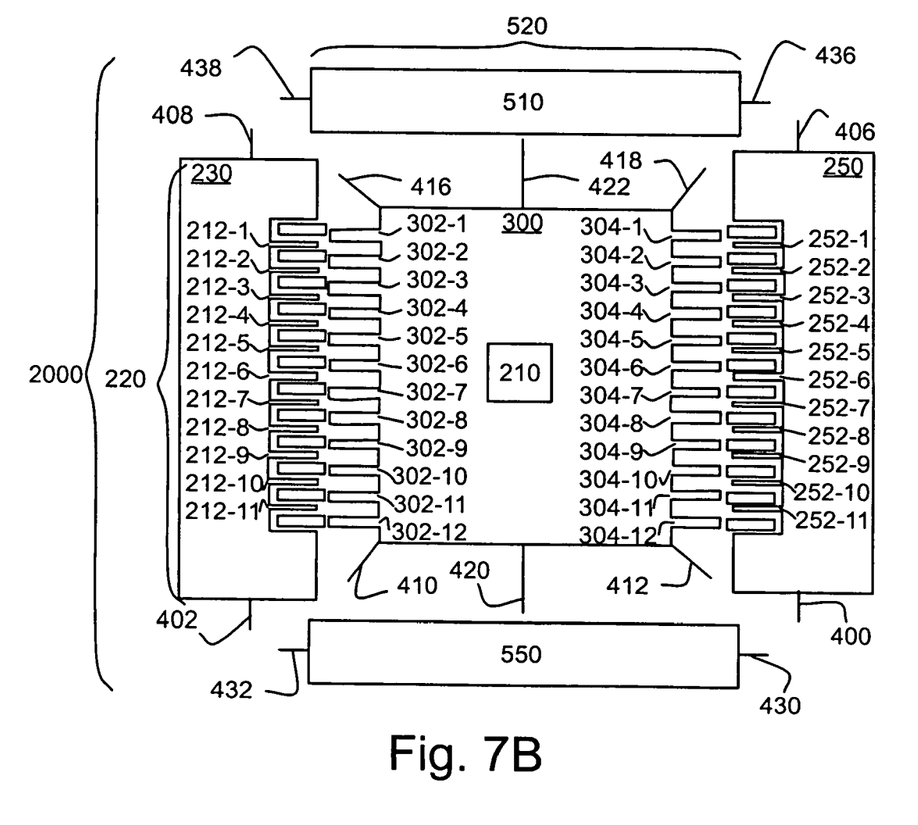

Examples of the invention using micro-actuator assemblies employing the electrostatic effect are shown in FIGS. 7A and 7B derived from the Figures of U.S. patent application Ser. No. 10/986,345, which is incorporated herein by reference. FIG. 7A shows a schematic side view of the micro-actuator assembly 80 coupling to the flexure finger 20 via a micro-actuator mounting plate 700. FIG. 7B shows the micro-actuator assembly using an electrostatic micro-actuator assembly 2000 including a first electrostatic micro-actuator 220 to aid the laterally positioning LP of the slider 90. The electrostatic micro-actuator assembly may further include a second electrostatic micro-actuator 520 to aid in the vertically positioning VP of the slider.

The first micro-actuator 220 includes the following. A first pivot spring pair 402 and 408 coupling to a first stator 230. A second pivot spring pair 400 and 406 coupling to a second stator 250. A first flexure spring pair 410 and 416, and a second flexure spring pair 412 and 418, coupling to a central movable section 300. A pitch spring pair 420-422 coupling to the central movable section 300. The central movable section 300 includes signal pair paths coupling to the amplified read signal ar0 and the write differential signal pair W0 of the read-write head 94 of the slider 90.

The bonding block 210 preferably electrically couples the read-write head 90 to the amplified read signal ar0 and write differential signal pair W0, and mechanically couples the central movable section 300 to the slider 90 with read-write head 94 embedded on or near the air bearing surface 92 included in the slider.

The first micro-actuator 220 aids in laterally positioning LP the slider 90, which can be finely controlled to position the read-write head 94 over a small number of tracks 122 on the rotating disk surface 120-1. This lateral motion is a first mechanical degree of freedom, which results from the first stator 230 and the second stator 250 electrostatically interacting with the central movable section 300. The first micro-actuator 220 may act as a lateral comb drive or a transverse comb drive, as is discussed in detail in the incorporated U.S. patent application.

The electrostatic micro-actuator assembly 2000 may further include a second micro-actuator 520 including a third stator 510 and a fourth stator 550. Both the third and the fourth stator electostatically interact with the central movable section 300. These interactions urge the slider 90 to move in a second mechanical degree of freedom, aiding in the vertically positioning VP to provide flying height control. The second micro-actuator may act as a vertical comb drive or a torsional drive, as is discussed in detail in the incorporated U.S. patent application. The second micro-actuator may also provide motion sensing, which may indicate collision with the rotating disk surface 120-1 being accessed.

The central movable section 300 not only positions the read-write head 10, but is the conduit for the read signal r0, the write differential signal pair W0 and in certain embodiments. The electrical stimulus of the first micro-actuator 220 is provided through some of its springs.

In more detail, the flexure finger 20 for the slider 90, providing trace path rw for the read signal r0 and the write signal w0, as shown in FIG. 3A. The lateral control signal 82 preferably includes the first lateral control signal 82P1 and the second lateral control signal 82P2, as well as the AC lateral control signal 82AC. The flexure finger may further include a micro-actuator assembly 80 for mechanically coupling with the slider to aid in positioning the slider to access the data 122 on the rotating disk surface 120-1. The micro-actuator assembly may aid in laterally positioning LP the slider to the rotating disk surface 120-1 as shown in FIG. 4A and/or aid in vertically positioning VP the slider as shown in FIG. 3A.

Manufacturing the invention's head gimbal assembly 60 includes coupling the flexure finger 20 to the invention's slider 90, which further includes electrically coupling the read trace path with the read signal. The invention includes the manufacturing process and the head gimbal assembly as a product of the process. Manufacturing the head gimbal assembly may further include coupling the micro-actuator assembly 80 to the slider. Coupling the micro-actuator assembly to the slider may include electrically coupling the first micro-actuator power terminal 82P1 and/or electrically coupling the second micro-actuator power terminal 82P2 and/or coupling the AC power terminal 82AC.

The invention's head stack assembly 50 includes at least one of the head gimbal assembly 60 coupled to an actuator arm 52 of a head stack as shown in FIG. 4A. The head stack assembly operates as follows when read accessing the data 122, preferably organized as the track 122, on the rotating disk surface 120-1. The slider 90 reports the read signal r0 as the result of the read access. The flexure finger provides the trace path rw for the read signal and for the write signal w0, as shown in FIG. 3A. The main flex circuit 200 receives the read signal from the trace path to create the read signal reported to the embedded circuit 500.

The head stack assembly may include more than one head gimbal assembly coupled to the head stack. By way of example, the head stack assembly coupled with a second head gimbal assembly 60-2 accessing a second side of the disk 12.the hard disk drive may include more than one disk, such as the second disk 12-2 shown in FIG. 5, each side of which may be used to access data, accessed by sliders in head gimbal assemblies, coupled through actuator arm(s) to the head stack.

Manufacturing the invention's head stack assembly 50 includes coupling said at least one of the invention's head gimbal assembly 60 to the head stack 50 to at least partly create said head stack assembly. The manufacturing process may further include coupling more than one head gimbal assemblies to the head stack. The manufacturing may further, preferably include coupling the main flex circuit 200 to the flexure finger 20. The invention includes the manufacturing process for the head stack assembly and the head stack assembly as a product of the manufacturing process. The step coupling the head gimbal assembly 60 to the head stack 50 may further, preferably include swaging the base plate 72 to the actuator arm 52.

The invention's hard disk drive 10 includes the head stack assembly 50 coupling through an actuator pivot 58 to a voice coil 32 for use in the voice coil motor 18 of the hard disk drive, as shown in FIGS. 3A, 4A and 5. The actuator pivot and fixed magnet 34 are mounted on a disk base 14. The disk base is connected to the disk cover 16 and the embedded circuit 500 is connected to the disk base and the voice coil motor 18 as some of the mechanical steps to manufacturing the hard disk drive.

The hard disk drive 10 may preferably include the head stack assembly 50 electrically coupled to an embedded circuit 500 to process the read signal during the read access to the data 122, preferably organized as the track 122, on the rotating disk surface 120-1. The hard disk drive operates as follows when read accessing the data on the rotating disk surface. The slider 90 reports the read signal r0 as the result of the read access. The flexure finger provides the trace path rw for the read signal and the write signal w0, as shown in FIG. 3A. The main flex circuit 200 receives the read signal from the trace path to create the read signal received by the embedded circuit to read the data on the rotating disk surface.

In more detail, the hard disk drive 10 may include a servo controller, and possibly the embedded circuit 500, coupled to the voice coil motor 18, to provide the micro-actuator stimulus signal 82 driving the micro-actuator assembly 80.

The embedded circuit 500 may preferably include a servo controller including a servo computer accessibly coupled to a memory. A program system may direct the servo computer in implementing the method operating the hard disk drive 10. The program system preferably includes at least one program step residing in the memory. The embedded circuit may preferably be implemented with a printed circuit technology. A micro-actuator driver preferably generates the lateral control signal 82. The lateral control signal preferably includes the first lateral control signal 82P1 and the second lateral control signal 82P2, as well as the AC lateral control signal 82AC.

The embedded circuit 500 includes a voice coil driver preferably stimulating the voice coil motor 18 through the voice coil 32 to control the coarse lateral position LP of the slider 90 and the read-write head 94, in particular, the read head 94-R near the track 122 on the rotating disk surface 120-1.

During normal disk access operations, the embedded circuit 500 and/or the servo controller direct the spindle motor 270 to rotate the spindle shaft 40. This rotating is very stable, providing a nearly constant rotational rate through the spindle shaft to at least one disk 12 and sometimes more than one disk. The rotation of the disk creates the rotating disk surface 120-1, used to access the track 122 while accessing the track. These accesses normally provide for reading the track and/or writing the track.

The preceding embodiments have been provided by way of example and are not meant to constrain the scope of the following claims.

What is claimed is:

1. A slider for a hard disk drive, comprising:
   at least one pad including a layer of a shape memory alloy coated with a contact layer of titanium oxide, to make contact with a disk surface included in said hard disk drive;
   wherein said slider accesses data stored on said disk surface when said disk surface is rotated in said hard disk drive;
   wherein said hard disk drive is a Crash Start Stop (CSS) hard disk drive.

2. The slider of claim 1, further comprising:
   at least two of said pads including said shape memory alloy with said contact layer of said titanium oxide, to make contact with said disk surface.

3. The slider of claim 1, wherein said shape memory alloy includes at least one member of the group consisting of:
   a molecular combination of at least two elements which is a solid possessing at least two solid phases in the operating conditions and the storage conditions of said hard disk drive; and
   a crystalline combination of said at least two elements which is said solid possessing said at least two solid phases in said operating conditions and said storage conditions of said hard disk drive.

4. The slider of claim 3, wherein said shape memory alloy may include at least one member of the titanium nickel shape memory alloy group consisting of: a Titanium Nickel (TiNi) alloy, a Titanium Nickel Iron (Ti—Ni—Fe) alloy, a Titanium Nickel Copper (Ti—Ni—Cu) alloy, a Titanium Nickel Lead (Ti—Ni—Pb) alloy, and a Titanium Nickel Hafnium (Ti—Ni—Hf) alloy.

5. The slider of claim 1, wherein said pad further includes a layer of a Diamond Like Carbon (DLC) coupling between a slider substrate and said layer of said shape memory alloy.

6. The slider of claim 1, further comprising: a read head including a member of the group consisting of: a spin valve and a tunnel valve.

7. A method of manufacturing said slider of claim 1, comprising the step:
   forming said at least one pad, further comprising the steps:
   forming said layer of said shape memory alloy coupling to a slider substrate; and
   forming said layer of said titanium oxide to coat said layer of said shape memory alloy.

8. The method of claim 7, wherein the step forming said at least one pad further comprises the step:
   forming a layer of a Diamond Like Carbon (DLC) between said slider substrate and said layer of said shape memory alloy to couple said layer of said shape memory alloy to said slider substrate.

9. The method of claim 7, wherein the step forming said layer of said titanium oxide, further comprises the step:
   oxidizing said layer of said shape memory alloy to form said layer of said titanium oxide coating said layer of said shape memory alloy.

10. The slider as a product of the process of claim 7.

11. A head gimbal assembly for said hard disk drive of claim 1, comprising: said slider.

12. The head gimbal assembly of claim 11, further comprising: a micro-actuator coupling to said slider to aid in positioning said slider in said hard disk drive;
   wherein said micro-actuator uses a member of the group consisting of: a piezoelectric effect and an electrostatic effect, to aid in said positioning.

13. A method of manufacturing said head gimbal assembly of claim 11, comprising the step: using said slider to create said head gimbal assembly.

14. The head gimbal assembly as a product of the process of claim 13.

15. A head stack assembly for said hard disk drive of claim 11, comprising: said head gimbal assembly coupled to an actuator arm of a head stack.

16. A method of manufacturing said head stack assembly of claim 15, comprising the step: coupling said head gimbal assembly to said actuator arm of said head stack.

17. The head stack assembly as a product of the process of claim 16.

18. The hard disk drive of claim 15, comprising: said head stack assembly positioned to operate with a disk including said disk surface.

19. A method of manufacturing said hard disk drive of claim 18, comprising the step:
   positioning said head stack assembly to operate with said disk.

20. The hard disk drive as a product of the process of claim 19.

21. A method of operating said CSS hard disk drive of claim 1, comprising the steps:

said pad undergoes a solid-to-solid phase change from a first phase to a second phase, when said pad is in contact with said disk surface; and said pad undergoes a second solid-to-solid phase change from said second phase to said first phase, when said pad leaves said contact with said disk surface.

* * * * *